US012618796B2

(12) United States Patent
Heikenfeld

(10) Patent No.: US 12,618,796 B2
(45) Date of Patent: May 5, 2026

(54) CONTINUOUS APTAMER SENSING DEVICES WITH IMPROVED LONGEVITY BY GATING OF SAMPLE FLUID

(71) Applicant: University of Cincinnati, Cincinnati, OH (US)

(72) Inventor: Jason Heikenfeld, Cincinnati, OH (US)

(73) Assignee: University of Cincinnati, Cincinnati, OH (US)

( * ) Notice: Subject to any disclaimer, the term of this patent is extended or adjusted under 35 U.S.C. 154(b) by 346 days.

(21) Appl. No.: 18/027,431

(22) PCT Filed: Sep. 24, 2021

(86) PCT No.: PCT/US2021/051939
§ 371 (c)(1),
(2) Date: Mar. 21, 2023

(87) PCT Pub. No.: WO2022/072233
PCT Pub. Date: Apr. 7, 2022

(65) Prior Publication Data
US 2024/0027391 A1 Jan. 25, 2024

Related U.S. Application Data

(60) Provisional application No. 63/150,921, filed on Feb. 18, 2021, provisional application No. 63/085,456, filed on Sep. 30, 2020.

(51) Int. Cl.
*G01N 27/327* (2006.01)

(52) U.S. Cl.
CPC ................................. *G01N 27/3276* (2013.01)

(58) Field of Classification Search
CPC ......................... A61B 5/1473; G01N 27/3276
See application file for complete search history.

(56) References Cited

U.S. PATENT DOCUMENTS

| 2013/0307093 A1 | 11/2013 | Bikumandla |
| 2017/0100035 A1 | 4/2017 | Heikenfeld |

(Continued)

FOREIGN PATENT DOCUMENTS

| KR | 20060080097 A | 7/2006 |
| WO | 2017164982 A1 | 9/2017 |
| WO | 2021030517 A1 | 2/2021 |

OTHER PUBLICATIONS

European Search Report in European Patent Application No. 21876244. 1, dated Sep. 6, 2024, 6 pgs.

(Continued)

*Primary Examiner* — Gurpreet Kaur

(74) *Attorney, Agent, or Firm* — Wood Herron & Evans LLP

(57) ABSTRACT

A device and method for continuously sensing at least one target analyte in a sample fluid. The device 100 includes a plurality of electrochemical aptamer sensors 120, 122, 124, 126; and at least one gating component 132, 134, 136 associated with at least one electrochemical aptamer sensor of the plurality of electrochemical aptamer sensors. The method includes bringing a sample fluid 190 into contact with the device, and determining or measuring a change in an electrical current associated with the at least one electrochemical aptamer sensor to (1) determine the presence of an analyte in the sample fluid, or (2) measure the amount or concentration of an analyte in the sample fluid.

2 Claims, 2 Drawing Sheets

(56)                References Cited

U.S. PATENT DOCUMENTS

| 2017/0265789 A1 | 9/2017 | Naseri et al. |
| 2018/0113123 A1 | 4/2018 | Khine et al. |
| 2018/0235522 A1 | 8/2018 | Heikenfeld |
| 2018/0353748 A1 | 12/2018 | Heikenfeld et al. |
| 2019/0142311 A1 | 5/2019 | Heikenfeld et al. |
| 2019/0230766 A1 | 7/2019 | Sugahara et al. |
| 2019/0231236 A1 | 8/2019 | Heikenfeld et al. |
| 2019/0383770 A1 | 12/2019 | Choi et al. |
| 2020/0158680 A1 | 5/2020 | Hagen et al. |

OTHER PUBLICATIONS

International Search Report and Written Opinion in International Patent Application No. PCT/US2021/051939, dated Dec. 16, 2021, 12 pgs.

Shaver. "Alkanethiol Monolayer End Groups Affect the Long-Term Operational Stability and Signaling of Electrochemical, Aptamer-Based Sensors in Biological Fluids" 11214-11223. ACS: Applied Materials and Interfaces. Feb. 2020; Abstract; pp. 11215, 11216, 11219, 11221; Figure 1.

Zhang. "CuSO4/H202-Triggered Polydopamine/Poly(sulfobetaine methacrylate) Coatings for Antifouling Membrane Surfaces" 1210-1216. Langmuir. Jan. 2017; Abstract.

Zhao. "Using Two-Stage Chemical Amplification to Determine the Density of Defects in Self-Assembled Monolayers of Alkanethiolates on Gold" 3257-3264. ACS Journal of Surfaces and Colloids. Jan. 1996; Abstract; p. 3257.

Cerruti. "Poly(ethylene glycol) Monolayer Formation and Stability on Gold and Silicon Nitride Substrates" 10646=10653. Langmuir. Aug. 2008; Abstract.

Koo. "Porous Ion Exchange Polymer Matrix for Ultrasmall Au Nanoparticle-Decorated Carbon Nanotube Chemiresistors" 5413-5420. Chemistry of Materials. 2019; p. 6.

Suarez-Martinez. "Probing the interaction between gold nanoparticles and oxygen functionalized carbon nanotubes" 1549-1554. Elsevier. Feb. 2009; Entire Document.

International Search Report and Written Opinion in Intl. Patent Application No. PCT/US2022/044512, dated Mar. 15, 2023, 18 pgs.

100

190

136

134

132

120

126

124

122

110

100

190

136

134

120

126

124

122

110

200

230

220

226　224　222　210

CONTINUOUS APTAMER SENSING DEVICES WITH IMPROVED LONGEVITY BY GATING OF SAMPLE FLUID

CROSS-REFERENCE TO RELATED APPLICATIONS

This application claims priority to, and the benefit of the filing date of, U.S. Provisional Application No. 63/085,456 filed Sep. 30, 2020 and U.S. Provisional Application No. 63/150,921 filed Feb. 18, 2021, the disclosures of which are incorporated by reference herein in their entireties.

TECHNICAL FIELD OF THE INVENTION

The present invention relates to the use of electrochemical aptamer sensors.

BACKGROUND OF THE INVENTION

This section is intended to introduce the reader to various aspects of art that may be related to various aspects of the present invention, which are described and/or claimed below. This discussion is believed to be helpful in providing the reader with background information to facilitate a better understanding of various aspects of the present invention. Accordingly, it should be understood that these statements are to be read in this light, and not as admissions of prior art.

Electrochemical aptamer sensors can identify the presence and/or concentration of an analyte of interest via the use of an aptamer sequence that specifically binds to the analyte of interest. These sensors include aptamers attached to an electrode, wherein each of the aptamers has a redox active molecule (redox couple) attached thereto. The redox couple can transfer electrical charge to or from the electrode. When an analyte binds to the aptamer, the aptamer changes shape, bringing the redox couple closer to or further from, on average, the electrode. This results in a measurable change in electrical current that can be translated to a measure of concentration of the analyte. Such electrochemical aptamer sensors may include multiple (2 or 3 or more) electrodes.

A major unresolved challenge for electrochemical aptamer sensors is the lifetime of the sensors, especially for applications where continuous operation is required ("continuous" referring to multiple measurements over time by the same device). Electrochemical aptamer sensors are susceptible to degradation due to, among other things, solutes in a fluid sample that are potentially harmful to the sensor (such as nucleases that can degrade the aptamers, or fouling proteins such as albumin) Harmful solutes such as these can reduce the operational life of the sensor, and thus any device including an electrochemical aptamer sensor. Thus, to date, it has been difficult to provide electrochemical aptamer sensors with a lifetime that allows continuous sensing to take place over an extended period of time.

Previously, features such as membranes have been used to attempt to block harmful solutes from affecting sensors. However, while membrane protection has been shown to improve aptamer longevity, it is not feasible when the purpose of the sensor is to measure large analytes such as proteins over an extended period of time. While membranes can block harmful solutes (such as those that could foul the sensor or degrade the aptamer), these membranes could also block the protein of interest, such as thrombin or luteinizing hormone. Therefore, for some analytes, there is currently no choice but to expose the sensor to many, or all, of the harmful solutes in a sample fluid such as blood, interstitial fluid, sweat, river water, or other sample fluids.

In view of the above, new devices and methods are needed that can provide improved longevity of electrochemical aptamer sensors and related devices for measurement of large analytes such as proteins. Such new devices and methods may also result in improvements for the use of such devices to detect or measure small analytes as well, where inherent degradation mechanisms such as electrode degradation occur regardless of sample fluid content.

SUMMARY OF THE INVENTION

Certain exemplary aspects of the invention are set forth below. It should be understood that these aspects are presented merely to provide the reader with a brief summary of certain forms the invention might take and that these aspects are not intended to limit the scope of the invention. Indeed, the invention may encompass a variety of aspects that may not be explicitly set forth below.

Many of the drawbacks and limitations stated above can be resolved by creating novel and advanced interplays of chemicals, materials, sensors, electronics, microfluidics, algorithms, computing, software, systems, and other features or designs, in a manner that affordably, effectively, conveniently, intelligently, or reliably brings sensing technology into proximity with sample fluids containing at least one analyte of interest to be measured.

Various aspects of the present invention serve to reduce and/or eliminate the drawbacks of current electrochemical aptamer sensors described above. By doing so, aspects of the present invention provide an electrochemical aptamer sensor, device, and method that includes improved longevity of the device.

To that end, one aspect of the present invention is directed to a device (e.g., a continuous sensing device) including a plurality of electrochemical aptamer sensors, and at least one gating component associated with at least one electrochemical aptamer sensor of the plurality of electrochemical aptamer sensors. As will be described in greater detail below, the at least one gating component serves to protect the electrochemical aptamer sensor (and components thereof) from degradation due to, among other things, solutes in a fluid sample that are potentially harmful to the sensor (such as nucleases that can degrade the aptamers, or fouling proteins such as albumin).

Another aspect of the present invention is directed to a method for sensing at least one analyte in a sample fluid. The sensing performed in this method (or for any device described herein) may be continuous sensing (i.e., multiple measurements over time by the same device). The method includes bringing a sample fluid into contact with a device including at least one electrochemical aptamer sensor having a gating component associated therewith. Following this, the method includes determining or measuring a change in an electrical current associated with the at least one electrochemical aptamer sensor to (1) determine the presence of an analyte in the sample fluid, or (2) measure the amount or concentration of an analyte in the sample fluid.

BRIEF DESCRIPTION OF THE DRAWINGS

The objects and advantages of the disclosed invention will be further appreciated in light of the following detailed descriptions and drawings in which.

DETAILED DESCRIPTION OF THE INVENTION

Figure 1A:
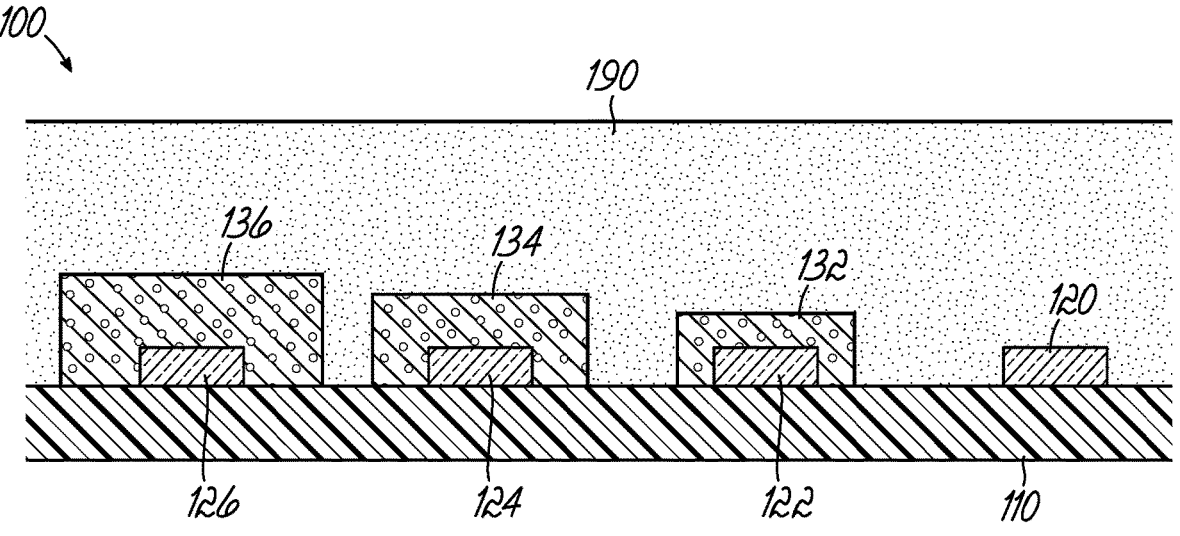
FIG. 1A is a cross-sectional view of a device according to an embodiment of the disclosed invention.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As described above, electrochemical aptamer sensors are susceptible to degradation due to, among other things, solutes in a fluid sample that are potentially harmful to the sensor (such as nucleases that can degrade the aptamers, or fouling proteins such as albumin) Harmful solutes such as these can reduce the operational life of the sensor, and thus that of any device including an electrochemical aptamer sensor. Aspects of the present invention address this need by providing a variety of improvements to electrochemical aptamer sensors that prolong the use of the unit. Electrochemical aptamer sensors comprise one or more working electrodes to which recognition elements functionalized with redox indicators are bound. The one or more electrodes may comprise various materials and configurations. The electrode may comprise any suitable electrode material for electrochemical sensing, including, for example: gold or any gold-coated metal or material, titanium, tungsten, platinum, carbon, aluminum, copper, palladium, mercury films, silver, oxide-coated metals, semiconductors, graphite, carbon nanotubes, and any other conductive material upon which biomolecules can be conjugated.

As used herein, the term "about," when referring to a value or to an amount of mass, weight, time, volume, pH, size, concentration or percentage is meant to encompass variations of ±20% in some embodiments, ±10% in some embodiments, ±5% in some embodiments, ±1% in some embodiments, ±0.5% in some embodiments, and ±0.1% in some embodiments from the specified amount, as such variations are appropriate to perform the disclosed method.

As used herein, the term "aptamer" means a molecule that undergoes a conformation change as an analyte binds to the molecule, and which satisfies the general operating principles of the sensing method as described herein. Such molecules are, e.g., natural or modified DNA, RNA, or XNA oligonucleotide sequences, spiegelmers, peptide aptamers, and affimers. Modifications may include substituting unnatural nucleic acid bases for natural bases within the aptamer sequence, replacing natural sequences with unnatural sequences, or other suitable modifications that improve sensor function. Typically, aptamers are tagged with a redox couple such as methylene blue, and thiol bonded to a gold working electrode along with a blocking monolayer such as mercaptohexanol.

As used herein, the term "aptamer sensor" means at least one sensor that uses optical tagging or redox-reporter tagging of an aptamer, and a change in optical or electrical signal as a result of a shape conformation change of the aptamer as the aptamer binds with a target analyte.

The devices and methods described herein encompass the use of sensors. A sensor, as used herein, is a device that is capable of measuring the concentration of a target analyte in a sample fluid. As used herein, an "analyte" may be any inorganic or organic molecule, for example: a small molecule drug, a metabolite, a hormone, a peptide, a protein, a carbohydrate, a nucleic acid, a chemical, a particle, or any other composition of matter. The target analyte may comprise a drug. The drug may be of any type, for example, including drugs for the treatment of cardiac system, the treatment of the central nervous system, that modulate the immune system, that modulate the endocrine system, an antibiotic agent, a chemotherapeutic drug, or an illicit drug. The target analyte may comprise a naturally-occurring factor, for example a hormone, metabolite, growth factor, neurotransmitter, etc. The target analyte may comprise any other species of interest, for example, species such as pathogens (including pathogen induced or derived factors), nutrients, and pollutants, etc.

As used herein, the term "gating component" means any component that delays exposure of a sample fluid to at least one sensor where the time of exposure of sample fluid to the sensor is at or near the time of first use of that sensor. For example, a gating component could be actuated, for example electrically opened such as heating of wax or polymer that dissolves away or electrical generation of pH that changes solubility of a polymer or other material. A gating component could also be a dissolvable material that slowly dissolves away over time and at projected or reasonably predictable time uncovers a sensor that was previously protected by the dissolvable material.

Certain embodiments of the disclosed invention show sensors as simple individual elements. It is understood that many sensors require two or more electrodes, reference electrodes, or additional supporting technology or features which are not captured in the description herein. Sensors measure a characteristic of an analyte. Sensors are preferably electrical in nature, but may also include optical, chemical, mechanical, or other known biosensing mechanisms. Sensors can be in duplicate, triplicate, or more, to provide improved data and readings. Sensors may provide continuous or discrete data and/or readings. Certain embodiments of the disclosed invention show sub-components of what would be sensing devices with more sub-components needed for use of the device in various applications, which are known (e.g., a battery, antenna, adhesive), and for purposes of brevity and focus on inventive aspects, such components may not be explicitly shown in the diagrams or described in the embodiments of the disclosed invention. All ranges of parameters disclosed herein include the endpoints of the ranges.

As described above, various aspects of the present invention serve to reduce and/or eliminate the drawbacks of current electrochemical aptamer sensors described above. By doing so, aspects of the present invention provide an electrochemical aptamer sensor, device, and method that exhibits improved longevity.

To that end, one aspect of the present invention is directed to a device (e.g., a continuous sensing device) including a plurality of electrochemical aptamer sensors, and at least one gating component associated with at least one electrochemical aptamer sensor of the plurality of electrochemical aptamer sensors. As will be described in greater detail below, the at least one gating component serves to protect the electrochemical aptamer sensor (and components thereof) from degradation due to, among other things, solutes in a fluid sample that are potentially harmful to the sensor (such as nucleases that can degrade the aptamers, or fouling proteins such as albumin).

Figure 1B:
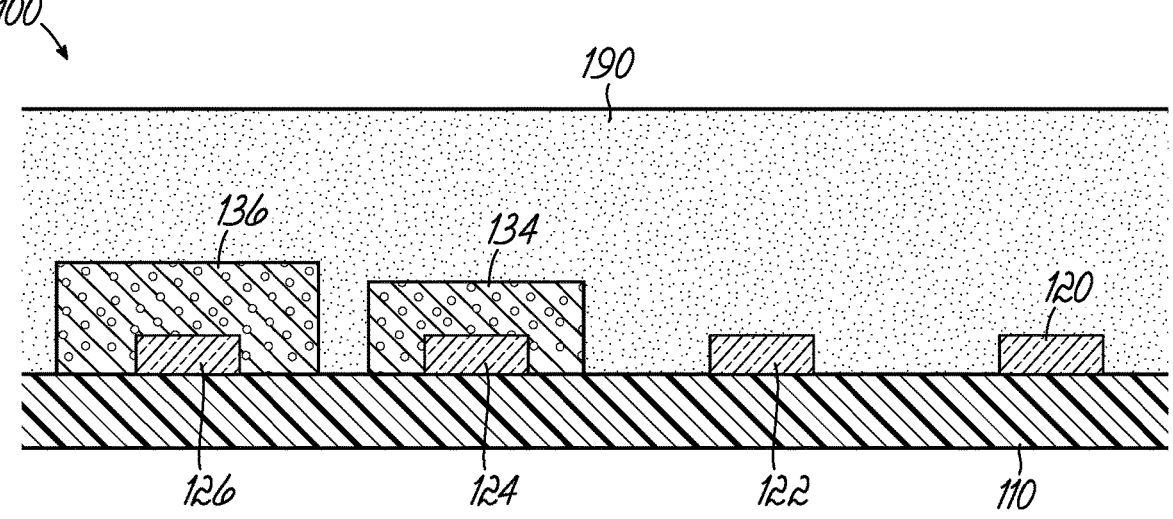
FIG. 1B is a cross-sectional view of a device according to an embodiment of the disclosed invention.

More specifically, and with reference to FIGS. 1A and 1B, in one embodiment, a device 100 includes a substrate 110 such as PET, glass, or other suitable material, and at least one electrochemical aptamer sensor (embodiment shown in FIGS. 1A and 1B include multiple electrochemical aptamer sensors 120, 122, 124, 126). At least one of the sensors has a gating component associated therewith (in the embodiment of FIG. 1A, each of sensors 122, 124, 126 has a gating component 132, 134, 136 associated therewith).

The gating component functions to delay exposure of an electrochemical sensor to a sample fluid (and thus to any harmful solute that may be present in the sample fluid). As one example, such a gating component could comprise a material that dissolves away over time (and at a reasonably predictable rate), so that, at predictable times, the sensor that was previously protected by the dissolvable material would become exposed to the sample fluid. For example, such a material could have a dissolution rate chosen from less than or equal to 4 mm/day, less than or equal to 1 mm/day, less than or equal to 7 μm/day, or less than or equal to 50 nm/day. By controlling the thickness of the material of the gating component associated with each sensor, the time at which the sensor would become exposed to sample fluid would be reasonably predictable. In the case of an electrochemical aptamer sensor, at that moment, aptamers associated with the electrode(s) would be exposed and could bind to any analyte in the sample fluid—thus changing the conformation of aptamers, and altering the relationship between redox couples attached to the aptamers and the electrode(s), thereby resulting in change of electrical current that can be read, measured, and translated into a reading of presence, or amount, or concentration of analyte. Alternatively, rather than a dissolvable material, a gating component could be actuated; for example, the gating component could be electrically opened such as by heating of wax or polymer that dissolves away or electrical generation of pH that changes solubility of a polymer or other material.

This and other embodiments of the device may include a plurality of gating components, with each gating component being associated with one of a plurality of electrochemical aptamer sensors. In embodiments with multiple sensors, the material of each of the gating components may include at least one property that provides each gating component with a time for complete dissolution. Such properties may include thickness of the material, or dissolution rate of the material. In certain embodiments, the device can be constructed to vary this property between the various gating components, such that the property (e.g., thickness, material having particular dissolution rate, etc.) of one of the gating components differs from the other gating components (or such that the property for each gating components differs from each of the other gating components).

Thus, by manipulating the properties of the gating components associated with individual sensors, one can provide a device having multiple sensors wherein (once the device is exposed to sample fluid) each of the sensors will become exposed to sample fluid and take readings at reasonably predictable different points in time—thereby providing a device that allows for continuous sensing, while providing sensors that will not be prematurely exposed to potentially harmful solutes.

For example, referring to FIGS. 1A and 1B, it can be seen that the gating components 132, 134, 136 differ at least in the property of thickness. Thus, upon exposure of the device 100 to sample fluid 190, the material (being a dissolvable material in this example) of the gating components 132, 134, 136 will simultaneously begin to dissolve. However, material of gating component 136 is thicker than material of gating component 134, which is thicker than material of gating component 132. And so, if each of gating components 132, 134, 136 are of the same material (or are differing materials having the same or similar dissolution rate), sensor 122 will be exposed to sample fluid 190 at a predictable time (prior to exposure of sensor 124 or sensor 126). Next, sensor 124 will be exposed to sample fluid 190. And finally, sensor 126 will be exposed to sample fluid 190. (It can also be seen from FIG. 1A that one sensor 120 may not have any gating component associated therewith. This allows for a first, immediate reading to be taken upon introduction of sample fluid 190 to device 100.)

It will be recognized by those of ordinary skill in the art that if material for gating component was chosen based on differing dissolution rates, one could prepare a device where the thicknesses of gating components were relatively the same/similar, but which would expose each sensor in a manner similar to that described above. Finally, those of ordinary skill in the art will recognize that different thicknesses of materials having different dissolution rates or other properties can be used in combination to achieve the desired result.

As a more specific example of a device in accordance with that described above, consider that sensor 120 could be an aptamer sensor for thrombin used in cardiac monitoring. For example, DNase1 is a 32- to 38-kDa protein that is the major nuclease present in the blood, and thrombin has a molecular weight of ~37 kDa. Membrane protection of the sensors 120, 122, 124, 126 would not be feasible and therefore the device described herein is particularly well suited to preserving sensors for analytes greater than 10 kDa. With further reference to FIG. 1A, in one embodiment the device is implanted in the body and the gating component 132, 134, 136 is a dissolvable polymer from Table 1:

TABLE 1

| The reduced erosion front width $(D/k)^{1/2}$ of various polymers | | | | |
|---|---|---|---|---|
| Polymers | $k_r$ (1/s) | D ($cm^2$/s) | $(D/k)^{1/2}$ | $(D k)^{1/2}$ |
| poly(anhydride) | 2E−03 | 1E−08 | 20 μm | 4 mm/day |
| poly(ortho ester) | 5E−05 | 1E−08 | 140 μm | 1 mm/day |
| poly(α-hydroxy ester) | 7E−09 | 1E−07 | 40 mm | 7 μm/day |
| poly(amide) | 3E−13 | 1E−08 | 2 m | 50 nm/day |

If, for example, each sensor had a working lifetime of 18 hours, and the target duration for use of the sensors was 3 months which is 2160 hours, then 120 sensors could be used, each with a varying thickness of the polymer comprising the gating component. Assuming a poly(amide) material for the gating component, the thickest gating component would last 90 days before it dissolves away, requiring the polymer to be 4.5 μm thick (50 nm*90=4.5 μm). Each polymer coating on each of 120 sensors could then be 50 nm less in thickness, such that a new sensor is uncovered each 18 hours. This uncovering of sensors is illustrated in FIG. 1B (which shows that sensor 122—which originally was covered by gating component 132 in FIG. 1A—has now become exposed to sample fluid 190 due to dissolution of gating component 132).

Figure 2:
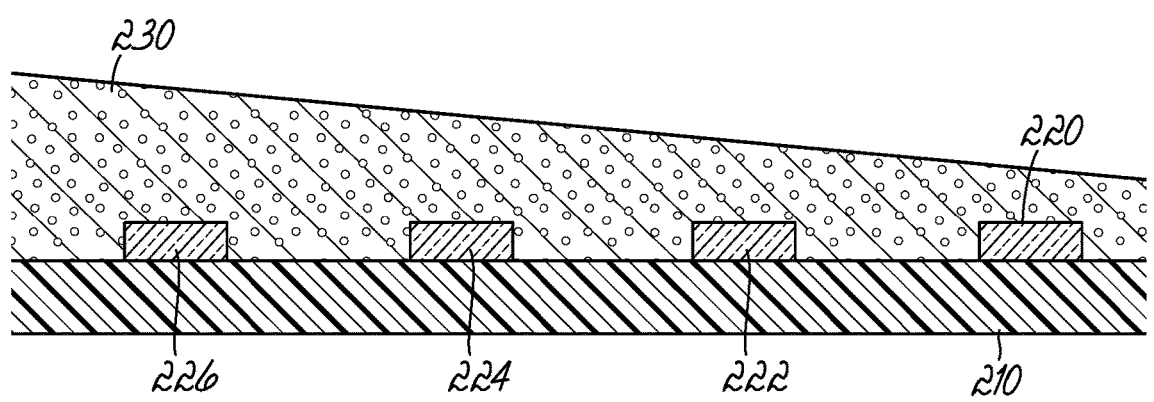
FIG. 2 is a cross-sectional view of a device according to an embodiment of the disclosed invention.

Although coating of sensors with differing polymer thickness is feasible on an individual sensor basis, it can be tedious, and so, in an alternate embodiment, a gradient coating approach for gating component 230 as shown in FIG. 2 (where like numerals refer to like features) can be used. Therefore, in one embodiment, the present invention comprises a plurality of sensors with a plurality of gating components that dissolve in sample fluid with different times for total dissolution. In another embodiment, the present invention comprises a single gating component that is variable in thickness. This approach results in sensors with partial exposure to sample fluid, and electrical impedance between the sensor or other measurement is used to determine when the sensor is fully exposed to sample fluid, indicating that sensing should begin for that sensor. In one embodiment, a variable thickness gating component is applied using precision molding. In another embodiment, variable-speed dip-coating is used. In another embodiment, a gating component is variable in dissolution rate. This may be achieved, for example, by incomplete polymer curing or by using multiple polymers with different dissolution rates. In other embodiments, gating components are actuated using an applied stimulus such as electrical current or photons of light. Variable thicknesses and dissolution rates and actuation methods can be used such that the present invention enables devices that can sense a biofluid continuously for, in different embodiments, greater than 1 day, greater than 1 week, greater than 1 month, greater than 6 months, and greater than 1 year.

With further reference to embodiments of the present invention, some gating components could potentially damage the sensor 122, 124, 126. For example, using temperatures or solvents for coating that are incompatible with the sensors 122, 124, 126 can be problematic. Therefore, in some embodiments, the sensors are first coated by a separating material of water-soluble protectants such as sucrose, polymers whose dissolution rate is sensitive to pH and rapid at the pH of the sample fluid, dried salt, water-soluble polymer such as PVA, denatured serum, or other protective material. A separating component or material can also allow the sensor to quickly reach operational status by dissolving more quickly than the gating component (that is, the sensor 122, 124, 126 will be more quickly uniformly wetted with biofluid), or the separating component could be at least in part a dissolvable hydrogel that will also swell when wetted by the sample fluid such as a biofluid. In this approach, the gating component is then applied on the separating material. Furthermore, the gating component need not touch the sensor. In some embodiments, the gating component is edge-laminated or edge-sealed to at least one sensor and separated from the sensor by at least one of a fluid or gas or protecting material. Epoxy, ultrasonic welding, or other techniques are suitable for edge sealing a gating component onto one or more sensors. In addition, once the sensors are 122, 124, 126 are exposed to biofluid, they could suffer from abrasion (e.g., and implanted device near a muscle or moving tissue). In some embodiments, a physically protective component such as a stainless steel or biocompatible ceramic screen is used (not shown).

With further reference to embodiments of the present invention, some gating components may not be precisely predictable as to when they would fully dissolve and expose a sensor. Therefore, sensors can be periodically measured to determine when they are exposed. For example, consider a highly electrically insulating gating material such as polyamide that would not allow significant electrical current at a working electrode and would limit current to <1 pA at that working electrode when covered with polyamide. Upon exposure to sample fluid, that material would begin to dissolve. During that time, the sensor could be periodically measured and, when the sensor reads a current greater than 1 nA, for example, the sensor would be considered exposed to biofluid for purposes of taking a reading of concentration of target analyte. Electrical impedance, decrease in current due to initial fouling of the working electrode, or other electrical means of determining when a sensor has been properly exposed to biofluid, can be used to determine when measurements of analyte concentrations can be commenced.

Apart from the above described aspects and embodiments directed to devices, another aspect of the present invention is directed to a method for sensing at least one analyte in a sample fluid. The sensing performed in this method (or for any device described herein) may be continuous sensing (i.e., multiple measurements over time by the same device). The method includes bringing a sample fluid into contact with a device including at least one electrochemical aptamer sensor having a gating component associated therewith. Following this, the method includes determining or measuring a change in an electrical current associated with the at least one electrochemical aptamer sensor to (1) determine the presence of an analyte in the sample fluid, or (2) measure the amount or concentration of an analyte in the sample fluid. As has been noted, bringing the sample fluid into contact with the device may further comprise bringing the sample fluid into contact with the gating component (i.e., because at least one of the sensors may have a gating component associated therewith, bringing the device into contact with thew sample fluid may initially accomplish bringing the sample fluid into contact with a gating component, such that a dissolution process of the material of the gating component may begin, for example).

As has been noted above, the electrochemical aptamer sensor may include at least one electrode, and a plurality of aptamers associated with the at least one electrode. There may further be at least one redox couple is associated with the aptamers. Thus, in embodiments of the method determining or measuring a change in an electrical current associated with the at least one electrochemical aptamer sensor may further comprise measuring an initial electrical current between the at least one electrode and the at least one redox couple. Following this measurement, one may also detect and/or measure a change from the initial electrical current between the at least one electrode and the at least one redox couple following bringing the sample fluid into proximity with the electrochemical aptamer sensor. As applied to the embodiments of the device described above, and shown in FIGS. 1A, 1B, and 2, this may also involve determining or measuring changes that occur between multiple readings—for example, noting changes in readings between those taken initially from sensor 120, those subsequently taken at a later time via sensor 122, those taken at a still later time via sensor 124, and those taken at a still later time via sensor 126.

Further, as the electrochemical aptamer sensor includes at least one electrode and a plurality of aptamers associated with the at least one electrode, bringing the sample fluid into contact with the device may comprise bringing the sample fluid into contact with the at least one electrode and plurality of aptamers. This may occur immediately upon bringing the sample fluid into contact with the device in certain embodiments. Alternatively, this may occur subsequent to bringing the sample fluid into contact with the gating component.

Although not described in detail herein, other steps which are readily interpreted from or incorporated along with the disclosed embodiments shall be included as part of the invention. The embodiments that have been described herein provide specific examples to portray inventive elements, but will not necessarily cover all possible embodiments commonly known to those skilled in the art.

What is claimed is:

1. A method comprising:

substantially simultaneously bringing a sample fluid into contact with multiple electrochemical aptamer sensors associated with a device, each electrochemical aptamer sensor of the multiple electrochemical aptamer sensors having a gating component associated therewith; and determining or measuring a change in an electrical current associated with the at least one electrochemical aptamer sensor to (1) determine the presence of an analyte in the sample fluid, or (2) measure the amount or concentration of an analyte in the sample fluid;

wherein each gating component includes a property having a value, and wherein the value of the property for each gating component is different than the value of the property for each of the other gating components; and wherein determining or measuring a change in an electrical current associated with the at least one electrochemical aptamer sensor is done multiple times at intervals; and wherein at least one measurement is made of each electrochemical aptamer sensor to determine the presence or absence of the gating component.

2. The method of claim 1, where once the absence of the gating component is determined by measurement of the electrochemical aptamer sensor, measurement of the analyte then follows.

* * * * *